(No Model.) 2 Sheets—Sheet 1.

J. G. WILSON.
MEANS FOR OPERATING AND SUPPORTING VENETIAN BLINDS.

No. 597,046. Patented Jan. 11, 1898.

WITNESSES:

INVENTOR,
Jas. G. Wilson
ATTORNEY (No Model.) 2 Sheets—Sheet 2.

J. G. WILSON.
MEANS FOR OPERATING AND SUPPORTING VENETIAN BLINDS.

No. 597,046. Patented Jan. 11, 1898.

WITNESSES:

INVENTOR
Jas. G. Wilson
ATTORNEY

UNITED STATES PATENT OFFICE.

JAMES GODFREY WILSON, OF NEW YORK, N. Y.

MEANS FOR OPERATING AND SUPPORTING VENETIAN BLINDS.

SPECIFICATION forming part of Letters Patent No. 597,046, dated January 11, 1898.

Application filed April 23, 1897. Serial No. 633,517. (No model.)

*To all whom it may concern:*

Be it known that I, JAMES GODFREY WILSON, a subject of Victoria, Queen of Great Britain, residing at New York, in the county of New York and State of New York, have invented certain new and useful Improvements in Means for Operating and Supporting Venetian Blinds; and I do hereby declare the following to be a full, clear, and exact description of the invention, such as will enable others skilled in the art to which it appertains to make and use the same.

My invention has reference to certain improvements in means for operating and supporting Venetian blinds, and has for its objects to support and hang the roller and tumbling-bar in such manner that they will not become sprung out of shape when allowed to remain in the same position any length of time, and, furthermore, to provide an exceedingly simple and effective means for elevating and lowering the blinds without disturbing the horizontal disposition of the slats.

Figure 1:
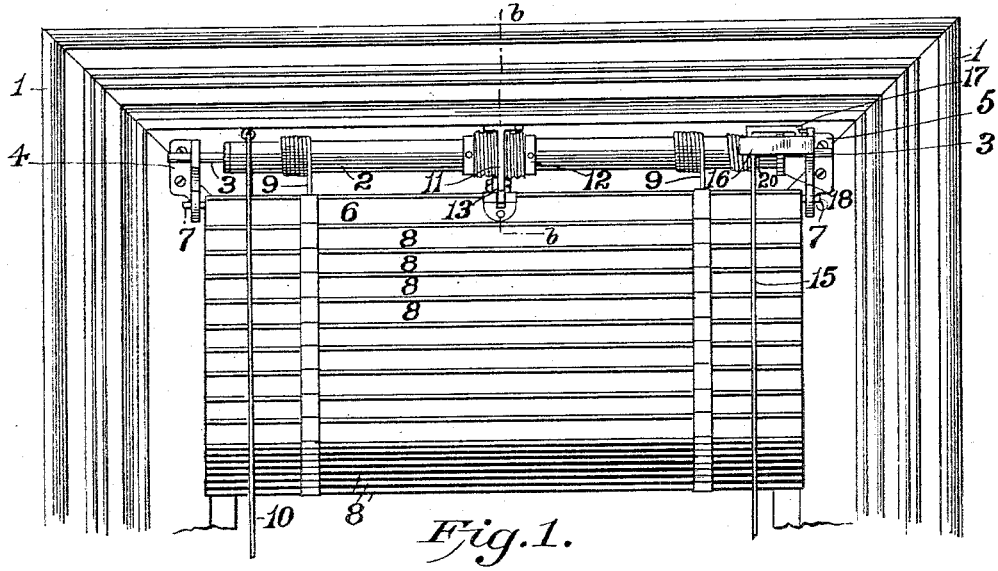
Figures 2, 3:
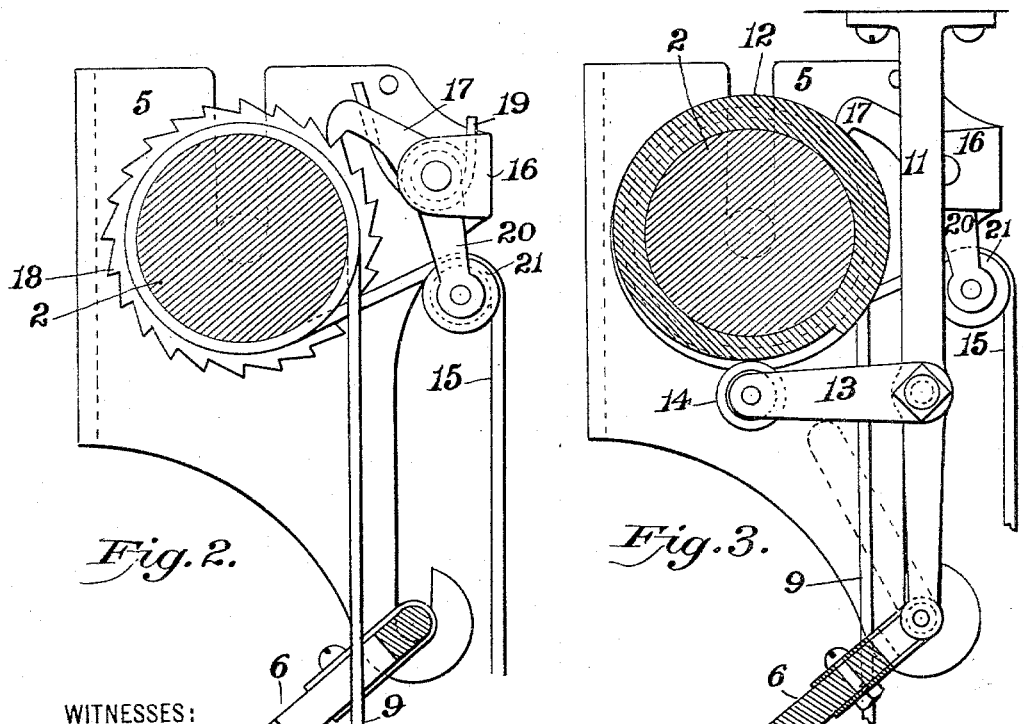
Figure 4:
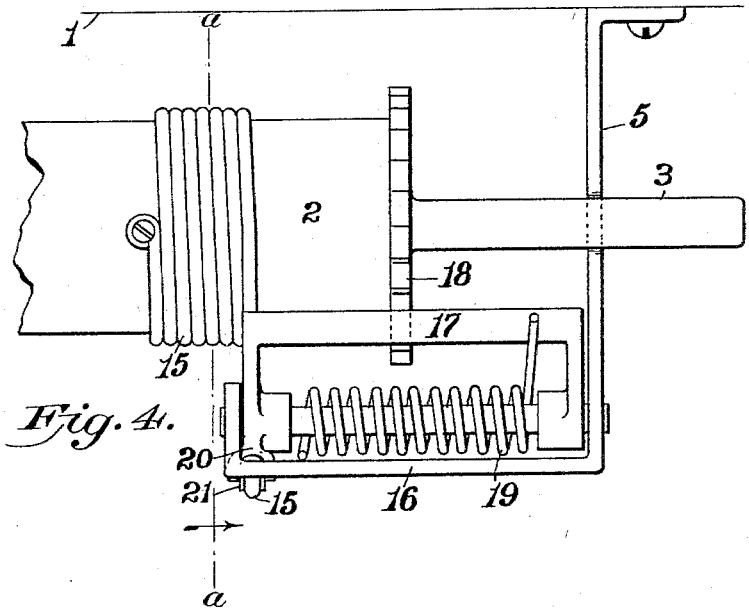
Figure 5:
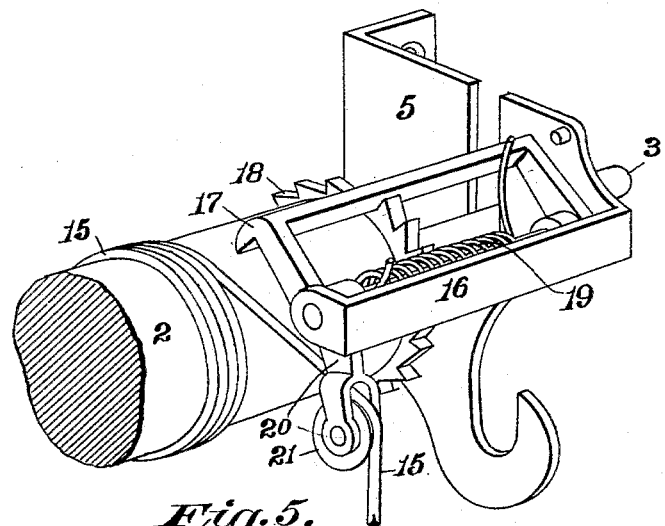

In the accompanying drawings, which form a part of this application, Figure 1 is a broken front elevation showing a window equipped with my improvement; Fig. 2, a section at the line *a a* of Fig. 4; Fig. 3, a section at the line *b b* of Fig. 1; Fig. 4, a detail plan view of the end of the roller, showing the same equipped with a suitable pawl-and-ratchet construction; and Fig. 5, a detail perspective of the parts shown at Fig. 4.

Similar numerals of reference denote like parts in the several figures of the drawings.

Heretofore when the blinds have been elevated and left in this position for any length of time the weight, coming, as it does, entirely upon the roller, has caused the latter to spring or bow out of shape, thus rendering it well nigh useless as a properly-operating part; also, if the blinds have been allowed to remain in lowered condition for any great length of time the result has been that the tumbling-bar has become sprung out of shape, owing to the fact that it sustains the weight of the blinds; also, the winding-cords, which depend from the roller and are connected with the bottom slat of the blinds, do not always wind on the roller properly, owing to the fact that the coils of these cords pile upon each other, thus producing the effect of a winding-roller having different diameters at the point where the winding occurs. For instance, if one cord should wind very regularly, so that the effective diameter of the roller would not become materially increased, and if, at the same time, the other cord should so wind that its coils would be piled upon each other, thus increasing the effective diameter of the roller half an inch or more, it will be clear that that end of the blinds where such irregular winding occurs will be elevated considerably above the other end.

My improvement aims to overcome the above-noted defects and will be clearly understood from the following description:

1 is the window-casing, and 2 the winding-roller, having at its extremities elongated pintles 3, supported within brackets 4 5, secured to the upper part of the casing.

6 is the usual tumbling-bar, having at its extremities pintles 7, supported within extensions of the brackets 4 5, and depending from said bar and connected therewith in the usual manner are the blind-slats 8. 9 are the usual winding-cords, secured to the roller 2 and depending through openings in the bar 6 and slats 8 and secured at the lower extremities to the lower slat.

10 is the usual cord, which connects in the ordinary manner with the tumbling-bar 6 and is operated to swing the latter upon its pivotal supports for the purpose of opening and closing the slats of the blinds.

The construction above described is all old and well known, and my improvement is readily applied to such construction.

11 is a bracket which depends from the window-casing, at or about the center thereof, its lower extremity being pivoted in any ordinary manner to the tumbling-bar 6, at the central portion of the same, so that it will be clear that said bar will be properly supported at its center in addition to the end supports and at the same time will be capable of its usual rocking movements.

Secured around the roller 2, midway of its length, is a screw-threaded sleeve 12, and adjustably secured to the bracket 11 is an arm 13, which carries at its extremity a disk 14, which latter engages with the thread on the sleeve and is stationary, except as to rotary movement, so that it will be clear that as the roller revolves it will have a traversing movement, owing to the engagement of said thread and disk. The arm 13 is made adjustable in any ordinary manner to accommodate sleeves of different sizes or to allow for the normal supporting of the roller 2 in different horizontal planes.

It will thus be readily understood that when the roller 2 is revolved to elevate the blinds said roller in its traversing movements will constantly present a plain surface for the winding of the cords 9, so that the coils of the latter will be neatly disposed side by side, as shown at Fig. 1, and this result will be brought about without swinging or disturbing in the slightest the position of the blinds, and at the same time the roller itself will always have a central support midway between the side brackets, so that there can be no springing of the roller.

15 is the cord, one end of which is secured to the roller 2, while the other end hangs down, by which the blinds are elevated and allowed to drop, and while it is perfectly clear that my improvement, as heretofore described, is admirably adapted for use without the employment of any special devices for holding the roller stationary when the blinds are at any desired elevation, still I have provided such special devices and will now describe the same.

Of course the cord 15, after being manipulated to properly elevate or lower the blinds, might be fastened to any suitable clip or the like at the side of the window-casing, and thus effect the holding of the roller 2, and therefore I do not wish to be limited to any special contrivance of this sort.

The bracket 5 is formed with an inward extension 16, which is immediately in front of the roller 2, and within this extension is pivoted an elongated pawl 17, while on the end of the roller is secured a ratchet 18, with which said pawl is normally engaged, owing to the effect of a spring 19, whose extremities bear, respectively, against the extension 16 and the forward part of the pawl itself.

The pawl has a tail 20 which extends outwardly beyond the pivotal point of such pawl and carries a small pulley 21, over which the cord 15 passes, so that when said cord is pulled down to elevate the blinds said pawl will be elevated out of engagement with the ratchet, so as not to obstruct the free movement of the roller 2. When the cord 15 is slacked, the pawl will immediately become engaged with the ratchet, thus holding the blinds at any desired elevation.

It will thus be seen that a single operating-cord 15 is all that is necessary for the purpose of effecting the elevation and lowering of the blinds, while at the same time the latter must always preserve a true horizontal position.

I place the screw at the center of the roller, because it is better that it should be in this position in order to afford a central support; but it will be clear that such screw could be placed at one end of the roller and that a traversing movement of the latter would thus be obtained.

The screw carried by the roller is in reality a spiral track, while the disk extends within said track, after the manner of a shoe; but it will be obvious that the disk might be provided with a peripheral groove, so that the disk could fit over the apex of the screw-thread, and such construction would clearly be the equivalent of that shown and heretofore described.

Having thus described my invention, what I claim as new, and desire to secure by Letters Patent, is—

1. The combination with a Venetian-blind roller supported by elongated bearings at the extremities and carrying winding-cords, of a bracket intermediate the end supports, an arm on said bracket, and a spiral thread on the roller engaged by the bracket-arm, whereby the roller is both supported and made to traverse as it rotates by means of the bracket, substantially as described.

2. The combination with the Venetian-blind roller, means for rotating the same, and means for traversing the roller in the direction of its length while rotating, of the ratchet connected to said blind-roller, and the pivoted pawl of greater width than the ratchet, and in position to engage the ratchet in its traversed positions, substantially as described.

3. The combination of a Venetian-blind roller provided with elongated pintles at its ends, side brackets within which said pintles are supported, the elongated spiral track carried by said roller at its central portion, the stationary bracket opposite said track and carrying the disk in engagement with said track, and the tumbling-bar supported at its extremities within said side bracket and pivoted at its central portion to said disk-carrying bracket, substantially as set forth.

4. The combination of the blind-roller having elongated end bearings, and means for traversing said roller lengthwise while rotating, a ratchet-wheel on said roller, the side brackets one of which is provided with a lateral extension, the pawl pivoted within said extension and provided with a tail projecting beyond its pivotal point and carrying a pulley, the spring whereby said pawl is normally engaged with said ratchet, and the operating-cord carried by said roller and supported by said pulley, substantially as set forth.

In testimony whereof I affix my signature in presence of two witnesses.

JAS. GODFREY WILSON.

Witnessss:
ARCHD. MCNICOLL,
A. L. JAEGER.